(12) United States Patent
Sato et al.

(10) Patent No.: US 7,026,025 B2
(45) Date of Patent: Apr. 11, 2006

(54) GLASS PREFORM AND METHOD OF PRODUCING THE SAME

(75) Inventors: Fumio Sato, Moriyama (JP); Akihiko Sakamoto, Shiga (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 71 days.

(21) Appl. No.: 10/389,180

(22) Filed: Mar. 14, 2003

(65) Prior Publication Data

US 2003/0172682 A1    Sep. 18, 2003

(30) Foreign Application Priority Data

| Mar. 14, 2002 | (JP) | ............................. 2002-070354 |
| May 22, 2002 | (JP) | ............................. 2002-148345 |
| Mar. 7, 2003 | (JP) | ............................. 2003-061019 |

(51) Int. Cl.
*B29D 22/00* (2006.01)
*B29D 23/00* (2006.01)
*B32B 1/08* (2006.01)

(52) U.S. Cl. .................. 428/34.4; 428/36.91; 428/426; 385/125; 385/126; 385/142

(58) Field of Classification Search ............... 428/34.1, 428/34.4, 34.5, 34.6, 36.9, 36.91, 426; 385/125, 385/126, 123, 142
See application file for complete search history.

(56) References Cited

U.S. PATENT DOCUMENTS

| 2002/0118938 A1* | 8/2002 | Hasegawa et al. ........... 385/125 |
| 2003/0068150 A1* | 4/2003 | Ariel et al. .................. 385/125 |
| 2004/0096173 A1* | 5/2004 | Fekety et al. ................ 385/125 |
| 2004/0105641 A1* | 6/2004 | Russell et al. ............... 385/125 |

FOREIGN PATENT DOCUMENTS

| JP | 2002 55242 | 2/2002 |
| JP | 2002 97034 | 4/2002 |
| WO | WO 99/00685 | 1/1999 |
| WO | WO 00/60388 | 12/2000 |

* cited by examiner

*Primary Examiner*—Michael C. Miggins
(74) *Attorney, Agent, or Firm*—Collard & Roe, P.C.

(57) ABSTRACT

In a glass preform (10) to be subjected to fiber-drawing, use is made of a cylindrical glass tube (21) whose one end in an axial direction is sealed. A plurality of glass capillaries (22) extend in the glass tube in the axial direction. The glass capillaries are fused to one another into an integral structure. The glass capillaries have air holes periodically arranged on a plane perpendicular to the axial direction, respectively.

16 Claims, 5 Drawing Sheets

GLASS PREFORM AND METHOD OF PRODUCING THE SAME

BACKGROUND OF THE INVENTION

This application claims priority to prior applications JP 2002-70354 and JP 2002-148345, the disclosures of which are incorporated herein by reference.

The present invention relates to a glass preform as a raw material for producing an optical waveguide material, such as a photonic crystal fiber (PCF), a holeyfiber, or a photonic bandgap fiber (PBF), having a number of air holes periodically arranged in its cross section (having a periodic structure in its cross section) and to a method of producing the glass preform.

An optical waveguide material, such as a photonic crystal fiber, a holey fiber, or a photonic bandgap fiber, having a periodic structure in its cross section is excellent in optical transmission characteristic and therefore attracts attention as an important material in a future optical communication system. In order to produce the above-mentioned optical waveguide material, proposal has been made of a first method of drawing a bundle of circular cylindrical silica glass capillaries to obtain an integral structure and a second method of preparing a bundle of polygonal columnar silica glass capillaries as a preform and drawing the preform to obtain an integral structure.

In the first method, however, it is difficult to precisely arrange the capillaries in a regular periodic structure. Therefore, it is difficult to obtain an optical waveguide material having a periodic structure. In addition, a number of air gaps are present between the capillaries. Therefore, the optical waveguide material inevitably has interstitial sites between the air holes. In the second method, it is easy to regularly arrange the capillaries. However, in order to process the capillaries into a polygonal shape in section, much labor is required and, therefore, production cost is increased. If the processing accuracy is insufficient, the optical waveguide material inevitably has interstitial sites.

SUMMARY OF THE INVENTION

It is therefore an object of the present invention to provide a glass preform which is obtained at a low cost without requiring capillaries or rods to be processed into a polygonal shape in section and which is adapted to produce an optical waveguide material having an undisturbed periodic structure in its cross section without interstitial sites.

It is another object of the present invention to provide a method of producing the above-mentioned glass preform.

It is still another aspect of the present invention to provide an optical waveguide material having a periodic structure.

Other objects of the present invention will become clear as the description proceeds.

According to an aspect of the present invention, there is provided a glass preform to be subjected to fiber-drawing. The glass preform comprises a cylindrical glass tube whose one end in an axial direction is sealed and a plurality of glass capillaries extending in the glass tube in the axial direction and fused to one another into an integral structure. The glass capillaries has air holes periodically arranged on a plane perpendicular to the axial direction, respectively.

According to another aspect of the present invention, there is provided a method of producing a glass perform. The method comprises the steps of preparing a cylindrical glass tube whose one end in an axial direction is sealed, disposing a plurality of glass capillaries in the glass tube, and heating the glass tube with its interior kept in a reduced-pressure condition.

According to still another aspect of the present invention, there is provided an optical waveguide material produced by fiber-drawing of the glass preform and having a number of air holes periodically arranged on the plane.

DESCRIPTION OF THE PREFERRED EMBODIMENT

Figure 1:
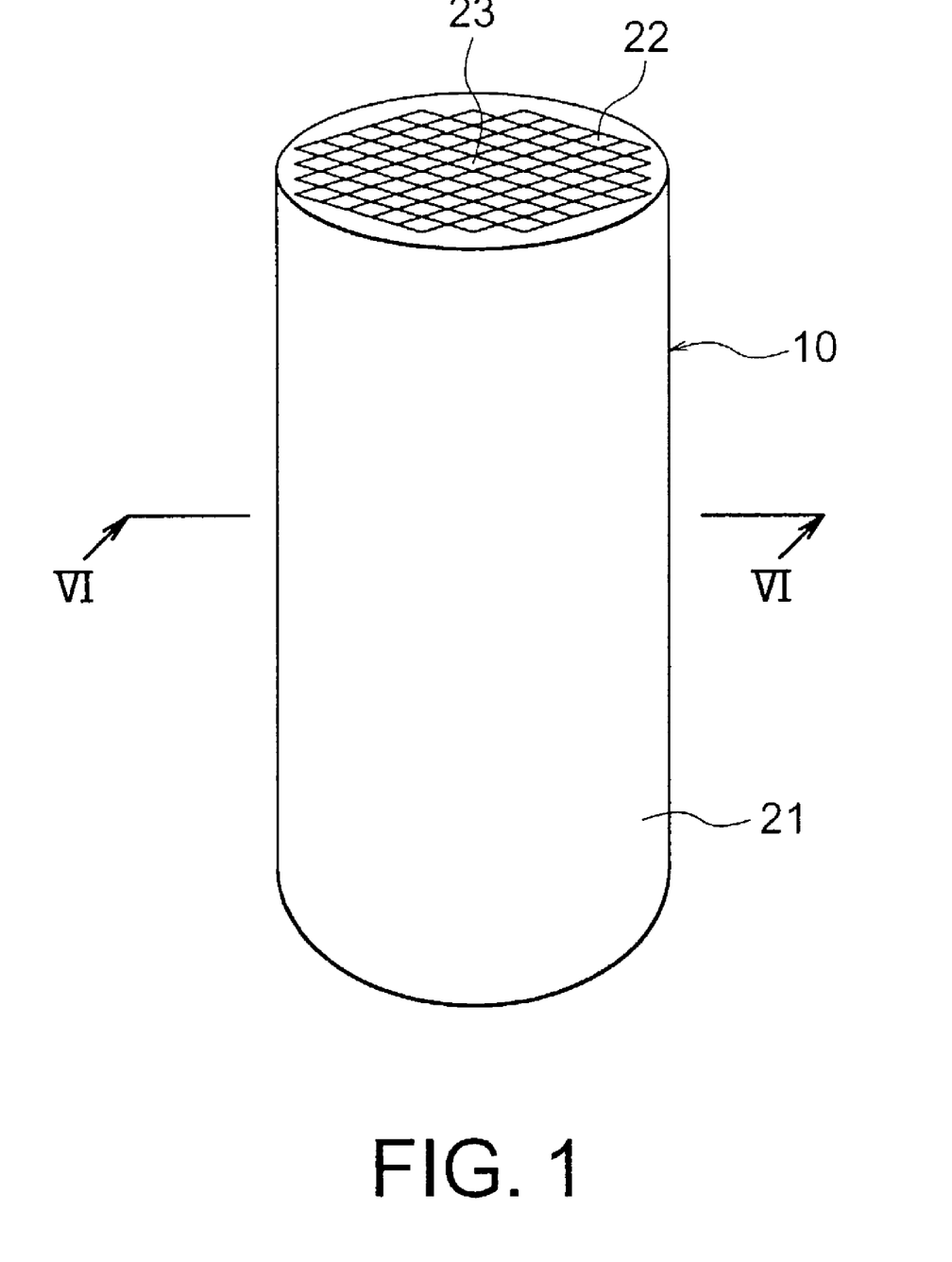
FIG. 1 is a perspective view of a glass preform according to an embodiment of the present invention.

Referring to FIG. 1, description will be made of a glass preform according to an embodiment of the present invention.

The glass preform depicted at 10 in FIG. 1 is to be subjected to fiber-drawing and comprises a cylindrical glass tube 21 whose one end or lower end in-an-axial direction is sealed, a plurality of glass capillaries 22 extending in the glass tube 21 in a vertical direction and fused to one another into an integral structure, and a glass rod 23 disposed in the glass tube 21 at its center and extending in the vertical direction.

Each of the glass capillaries 22 is sealed at longitudinal opposite ends thereof. In the glass tube 21, the glass capillaries 22 are arranged around the glass rod 23 and kept in tight contact with one another. Thus, air holes of the glass capillaries 22 are periodically arranged on a predetermined plane perpendicular to the axial direction.

In the glass preform 10, the glass capillaries 22 are fused to one another into an integral structure in which air gaps left between the glass capillaries 22 are reduced. By predetermined fiber-drawing using the glass preform 10 as a raw material, an optical waveguide material, such as a photonic bandgap fiber (PBF), can be produced which has a periodic structure substantially analogous to the periodic structure of the glass preform on the predetermined plane and which has no interstitial sites. Namely, when the glass preform 10 is heated and subjected to fiber-drawing, the air gaps are eliminated as a result of softening of glass. By controlling the pressure in the air holes of the glass capillaries 22 during the fiber-drawing, it is possible to adjust the size or diameter of the air holes.

In the glass preform 10, the air gaps left between the glass capillaries 22 are reduced. Therefore, the optical waveguide material having no interstitial sites can easily be obtained even if the temperature during the fiber-drawing is not so elevated. Since the opposite ends of the glass capillaries 22 are sealed, the size and the sectional shape of the air holes are hardly influenced by an external air pressure and are therefore stabilized. In particular, if one or a plurality of glass capillaries 22 are greater in inner diameter than the glass capillaries 22 therearound, it is possible to obtain an optical waveguide material, such as a photonic bandgap fiber (PBF), having one or a plurality of large air holes.

In the glass tube 21, the glass rod 23 is disposed and the glass capillaries 22 are disposed around the glass rod 23. Therefore, by the fiber-drawing using the glass preform 10 as a raw material, it is possible to produce an optical waveguide material, such as a photonic crystal fiber (PCF) or a holey fiber, having a core portion without an air hole. A plurality of glass rods 23 may be disposed in the glass tube 21.

Each of the glass capillaries 22 and the glass rod 23 is made of a multi-component glass, preferably a borosilicate glass. In this event, formation of the glass preform and fiber-drawing of the glass preform into the optical waveguide material can be carried out at a low temperature. Therefore, it is possible to suppress deterioration of a forming equipment due to heat or to perform production with a simple equipment, which is economical. In addition, use can be made of a common production process, such as the Danner process or the down drawing process. It is therefore possible to easily or economically produce glass preforms in various shapes. Furthermore, since the glass preforms in various shapes can easily be obtained, it is possible to easily control the periodic structure at a low temperature and to easily control optical properties of the optical waveguide material, such as a nonlinear optical effect or dispersion.

Specifically, each of the glass capillaries 22 and the glass rod 23 is made of a glass containing, by mass %, 55–95% $SiO_2$, 1–30% $B_2O_3$, and 0.1–10% $Na_2O$. Preferably, each of the glass capillaries 22 and the glass rod 23 is made of a glass essentially consisting of, by mass %, 55–95% $SiO_2$, 1–30% $B_2O_3$, and 0.1–10% $Na_2O$, 0–10% $Al_2O_3$, 0–5% CaO, 0–10% BaO, and 0–5% $K_2O$.

The glass tube 21 may be made of a multi-component glass same as that used for the glass capillaries 22 and the glass rod 23. In this event, the glass preform or the optical waveguide material can easily be formed.

Next, description will be made of respective components of the multi-component glass.

$SiO_2$ is a component forming a backbone structure (i.e., a network former) of the glass. The content of $SiO_2$ is 55–95%, preferably 60–90%, more preferably 65–80%. If the content of $SiO_2$ is greater than 95%, the viscosity of the glass is increased and the forming temperature during production of the glass capillaries, the glass rod, and the glass tube tends to become very high. The content smaller than 55% is not unfavorable because weather resistance, such as acid resistance and water resistance, is considerably degraded.

$B_2O_3$ has an effect of lowering the viscosity of the glass. The content of $B_2O_3$ is 1–30%, preferably 1–25%, more preferably 2–20%. If the content of $B_2O_3$ is greater than 30%, the weather resistance is considerably degraded. If the content of $B_2O_3$ is smaller than 1%, the viscosity of the glass is increased so that the forming temperature during production of the glass capillaries, the glass rod, and the glass tube tends to become very high.

$Na_2O$ has an effect of lowering the viscosity of the glass. The content of $Na_2O$ is 0.1–10%, preferably 0.5–8%. If the content of $Na_2O$ is greater than 10%, the weather resistance is considerably degraded so that the surface of the optical waveguide material is remarkably deteriorated in a high-temperature high-humidity condition. If the content is smaller than 0.1%, the viscosity of the glass is increased so that the productivity is decreased.

$Al_2O_3$ is a component forming the backbone structure of the glass, together with $SiO_2$, and has an effect of improving the weather resistance. The content of $Al_2O_3$ is 0–10%, preferably 0.5–8%. If the content of $Al_2O_3$ is greater than 10%, phase separation tends to occur. This results in occurrence of devitrification during production of the glass.

Each of CaO and BaO has an effect of lowering the viscosity. However, if the content is excessive, the weather resistance of the product is considerably degraded. In view of the above, the content of CaO is 0–5%, preferably 0–3%. Similarly, the content of BaO is 0–10%, preferably 0–5%.

$K_2O$ has an effect of lowering the softening point of the glass. However, if the content is excessive, devitrification occurs during production of the glass and the productivity is decreased. In view of the above, the content of $K_2O$ is 0–5%, preferably 0–3%.

In the above-mentioned preform 10, each of the glass capillaries 22 and the glass rod 23 is preferably made of a glass without absorption of light having a wavelength of 1400 nm by OH groups. In this event, the optical waveguide material produced by the fiber-drawing has a reduced optical loss at an E-band frequency (1360 to 1460 nm).

Each of the glass capillaries 22 and the glass rod 23 is preferably made of a glass having a refractive index (nd) between 1.45 and 2.00, preferably between 1.47 and 2.00. In the optical waveguide material produced by the use of the above-mentioned glass, an effective difference in refractive index between a core and a cladding is great. This makes it possible to obtain a dispersion property which has not been achieved by an existing silica-based optical fiber.

Referring to FIGS. 2A to 2D, description will be made of a method of producing the glass preform 10 in FIG. 1.

Figures 2A, 2B:
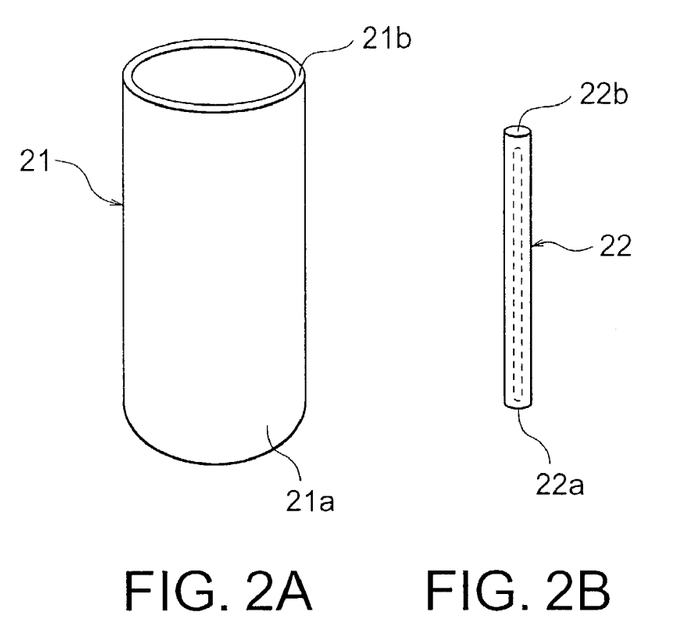
FIG. 2A is a perspective view of a glass tube used in the glass preform illustrated in FIG. 1.
FIG. 2B is a perspective view of a glass capillary used in the glass preform illustrated in FIG. 1.
Figure 2C:
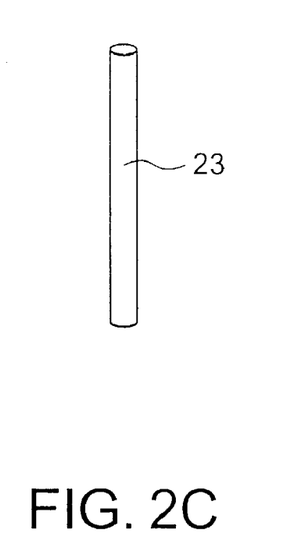
FIG. 2C is a perspective view of a glass rod used in the glass preform illustrated in FIG. 1.

At first, preparation is made of the cylindrical glass tube 21, a plurality of the glass capillaries 22, and the glass rod 23. As illustrated in FIG. 2A, the cylindrical glass tube 21 has one end 21a and the other end 21b in the axial direction which are sealed and opened, respectively. As illustrated in FIG. 2B, each of the glass capillaries 22 has a longitudinal one end 22a and the other end 22b both of which are sealed. As illustrated in FIG. 2C, the glass rod 23 has no internal cavity. Next, the glass capillaries 22 and the glass rod 23 are inserted and disposed in the glass tube 21. The glass capillaries 22 are disposed in the glass tube 21 around the glass rod 23 and are kept in tight contact with one another without leaving any substantial gap.

In the above-mentioned state, the glass tube 21 is heated with its interior kept in a reduced-pressure or low-pressure condition. At this time, the interior of the glass tube 21 is preferably kept at pressure lower than −100 mmHg, preferably lower than −500 mmHg. In this event, the gaps between the glass capillaries 22 are completely eliminated and, simultaneously, the glass capillaries 22 are automatically packed into a close-packed state which is most stable. Thus, the glass preform having a highly regular periodic structure in its cross section is easily obtained.

Figure 3:
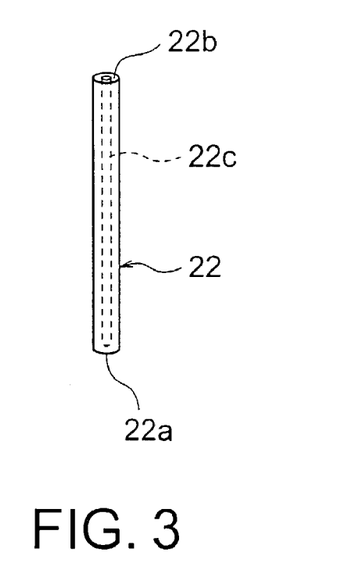
FIG. 3 is a perspective view of a modification of the glass capillary.

It is preferable to use the glass capillary 22 with its opposite ends 22a and 22b preliminarily sealed as described above. Alternatively, each of the glass capillaries 22 may have a structure in which the one end 22a alone is sealed while the other end 22b is opened, as illustrated in FIG. 3. In this event, the glass capillary 22 is disposed so that the other end 22b is faced to a bottom portion, i.e., the one end 21a of the glass tube 21. By heating and softening the bottom portion of the glass tube 21, the other end 22b of the glass capillary 22 is sealed by softening of the glass. Thereafter, the glass tube 21 is heated from the bottom portion towards an upper portion, i.e., the other end 21b. In this manner, a hole 22c of the glass capillary 22 is not collapsed even if heated in the reduced-pressure condition. By heating the glass tube 21 successively and gradually from the bottom portion towards the upper portion, air gaps are hardly left between the glass capillaries 22 and between the glass capillaries 22 and the glass rod 23.

Figure 4A:
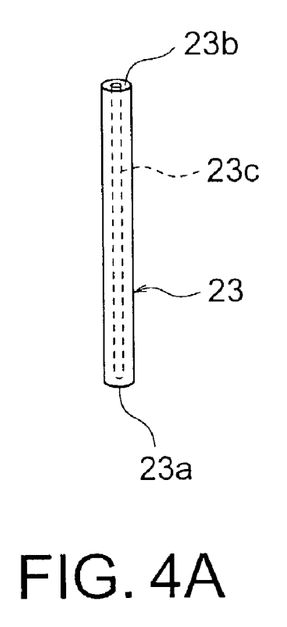
FIG. 4A is a perspective view of a first modification of the glass rod.
Figure 4B:
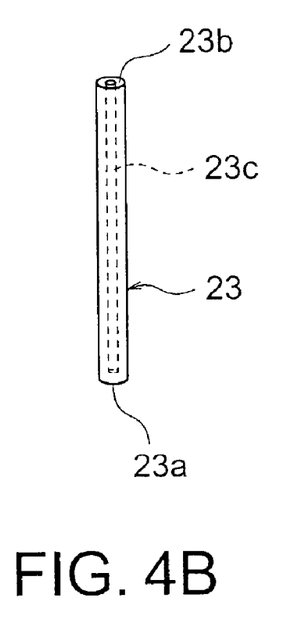
FIG. 4B is a perspective view of a second modification of the glass rod.

Referring to FIG. 4A, the glass rod 23 may comprise a long tubular member having a longitudinal one end 23a and the other end 23b which are sealed and not sealed, respectively, i.e., having a cavity which is opened at its one end. Referring to FIG. 4B, the glass rod 23 may comprise a long tubular member having opposite ends 23a and 23b both of which are opened. By the fiber-drawing using the glass preform as a raw material, the cavity within the tubular member is substantially completely lost. Thus, in this case also, it is possible to produce an optical waveguide material, such as a photonic crystal fiber (PCF) and a holey fiber, having a core portion without an air hole, as in the case where the glass rod 23 comprises a solid rod without any internal cavity.

Figure 4C:
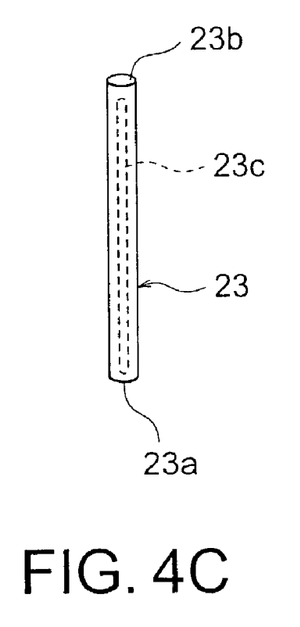
FIG. 4C is a perspective view of a third modification of the glass rod.

Referring to FIG. 4C, the glass rod 23 may comprise a tubular member having longitudinal opposite ends 23a and 23b both of which are sealed, and a closed hole 23c formed inside. By the fiber-drawing using the glass preform as a raw material, it is possible to produce an optical waveguide material having a large hole in a core portion, i.e., a so-called photonic bandgap fiber (PBF).

It is also possible to produce the PBF with the glass rod 23 of FIG. 4A being disposed so that the other end 23b is faced to a bottom portion, i.e., the one end 21a of the glass tube 21. By heating and softening the bottom portion of the glass tube 21, the other end 23b of the glass rod 23 is sealed by softening of the glass. As a result of heating, the glass rod 23 of FIG. 4A is modified into that is similar to the glass rod of FIG. 4C. Therefore, the PBF can be manufactured by the use of the glass rod 23 of FIG. 4A.

During the fiber-drawing, the glass preform is heated at a heating temperature $T_H$ preferably within a range given by $(T_S-200°$ C.$)<T_H<(T_S+200°$ C.$)$ where $T_S$ represents the softening point of the glass. If the heating temperature $T_H$ is equal to or lower than $(T_S-200°$ C.$)$, the air gaps between the glass capillaries are not filled. On the other hand, if the heating temperature is equal to or higher than $(T_S+200°$ C.$)$, the glass is excessively softened so that the periodic structure is disturbed.

By heating the glass tube 21 while the interior of the glass tube 21 is reduced in pressure or by heating the glass tube 21 after the interior of the glass tube 21 is reduced in pressure and then the upper portion of the glass tube 21 is sealed, the glass preform 10 can be formed.

Figure 5:
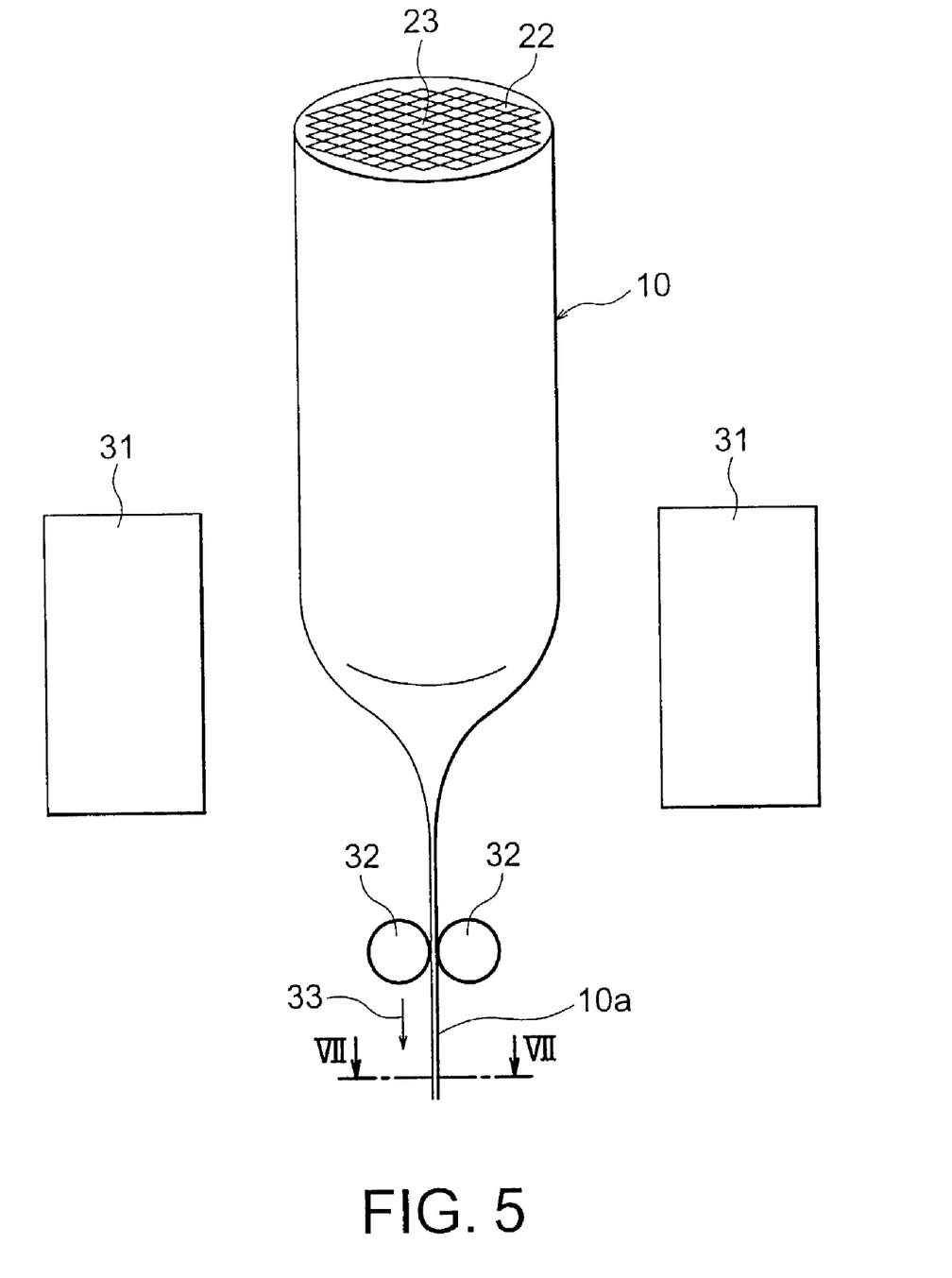
FIG. 5 is a view for describing production of an optical waveguide material by fiber-drawing of the glass preform in FIG. 1.

Referring to FIG. 5, the fiber-drawing will be described.

The glass preform 10 is inserted into an electric furnace 31. The glass preform 10 is heated and pulled by a roller 32 in a direction depicted by an arrow 33. By the fiber-drawing in the above-mentioned manner, an optical waveguide material 10a having a desired diameter and extending long is produced.

In the optical waveguide material 10a thus obtained, a number of small air holes deriving from the glass capillaries 22 are periodically arranged on a plane perpendicular to a longitudinal direction of the optical waveguide material 10a. In other words, the optical waveguide material 10a has a periodic structure substantially analogous to the above-mentioned periodic structure in the glass preform and having high regularity. Thus, it is possible to obtain an optical waveguide material, such as a photonic crystal fiber (PCF), a holey fiber, and a photonic bandgap fiber (PBF), which has no interstitial site and which is uniform in shape and size of the air holes.

Hereinafter, description will be made in conjunction with Examples 1 to 3 and Comparative Examples 1 and 2.

EXAMPLE 1

Preparation was made of the glass tube 21, the glass capillaries 22, 449 in number, and the glass rod 23. As illustrated in FIG. 2A, the glass tube 21 had a cylindrical shape with its bottom portion 21a sealed. The glass tube 21 had an outer diameter of 30 mmΦ and an inner diameter of 24 mmΦ. As illustrated in FIG. 2B, each of the glass capillaries 22 had the opposite ends 22a and 22b both of which are sealed. Each of the glass capillaries 22 had an outer diameter of 1 mmΦ and an inner diameter of 125 μmΦ. The glass rod 3 as illustrated in FIG. 2C had an outer diameter of 1 mmΦ. Each of the glass tube 21, the glass capillaries 22, and the glass tube 23 was made of a glass essentially consisting of, by mass %, 72.5% $SiO_2$, 6.8% $Al_2O_3$, 10.9% $B_2O_3$, 0.7% CaO, 1.2% BaO, 5.9% $Na_2O$, 1.8% $K_2O$, and 0.2% $Sb_2O_3$. The glass had a refractive index (nd) of 1.495.

Next, the glass rod 23 was disposed in the glass tube 21 at a substantial center thereof. Around the glass rod 21, the glass capillaries 22, 449 in number, were disposed so as to leave no substantial gap.

Then, the interior of the glass tube 21 is reduced in pressure to −750 mmHg by the use of a vacuum pump. With the above-mentioned reduced pressure maintained, the glass tube 21 was heated to 780° C. successively or gradually from the bottom portion towards an open end or the upper portion and contracted. After the glass tube 21 was heated to the open end and contracted, the glass tube 21 was gradually cooled to the room temperature. Thereafter, a normal pressure was recovered. Thus, the glass preform 10 illustrated in FIG. 1 was produced. Next, as illustrated in FIG. 5, the glass preform 10 was inserted into the electric furnace 31 and pulled by the roller 32 to be subjected to the fiber-drawing. In the above-mentioned manner, the optical waveguide material 10a was produced.

EXAMPLE 2

Use was made of the glass capillaries, 110 in number, each of which was made of a glass essentially consisting of, by mass %, 70.5% $SiO_2$, 6.0% $Al_2O_3$, 12.6% $B_2O_3$, 0.7% CaO, 2.1% BaO, 6.6% $Na_2O$, 1.3% $K_2O$, and 0.2% $Sb_2O_3$. The glass had a refractive index (nd) of 1.493. Each of the glass capillaries had an outer diameter of 2 mmΦ and an inner diameter of 250 μmΦ and was sealed only at one end thereof. The glass capillaries were packed in the glass tube so that the one ends as sealed ends are faced to the open end of the glass tube. Before the interior of the glass tube was reduced in pressure, the bottom portion of the glass tube was heated and softened so that the other end or unsealed ends of the glass capillaries were sealed as a result of softening of the glass tube. The glass preform and the optical waveguide material were produced in the manner similar to Example 1 except the above.

EXAMPLE 3

In Example 3, use was made of the glass capillaries having opposite ends both of which were not sealed. The heating temperature was 700° C. The glass preform and the optical waveguide material were produced in the manner similar to Example 1 except the above.

COMPARATIVE EXAMPLE 1

Use was made of the glass capillaries having opposite ends both of which were not sealed. The glass tube was heated without reducing the pressure in the glass tube. The glass preform and the optical waveguide material were produced in the manner similar to Example 1 except the above.

COMPARATIVE EXAMPLE 2

Use was made of the glass capillaries and the glass rod each of which was polished into a regular hexagonal cylinder having a longest diagonal of 2 mm in section. The glass tube was heated without reducing the pressure in the glass tube. The glass preform and the optical waveguide material were produced in the manner similar to Example 2 except the above.

Each of the glass preforms obtained in Examples 1 to 3 and Comparative Examples 1 and 2 was cut in a transversal direction. The transversal or cross section was observed by an optical microscope to evaluate an air hole interval, an air gap between the glass capillaries, variation in size of the air holes, and the shape of the air holes. For the optical waveguide material, its cross section in a SEM (Scanning Electron Microscope) image was observed to evaluate the air hole interval, the interstitial site, variation in size of the air holes, and the shape of the air holes. The result of evaluation is shown in Table 1.

TABLE 1

| | | Example | | | Comparative Example | |
|---|---|---|---|---|---|---|
| | | 1 | 2 | 3 | 1 | 2 |
| glass preform | air hole interval | uniform | uniform | uniform | non-uniform | non-uniform |
| | air gap between glass capillaries | not present | not present | present | present | present |
| | variation in size of air holes | no | no | no | varied | varied |
| | shape of air holes | true circle | true circle | true circle | ellipse | ellipse |
| optical waveguide material | air hole interval | uniform | uniform | uniform | non-uniform | non-uniform |
| | interstitial site | not present | not present | not present | present | present |
| | variation size of air holes | no | no | no | varied | varied |
| | shape of air holes | true circle | true circle | true circle | ellipse | ellipse |

Figure 6:
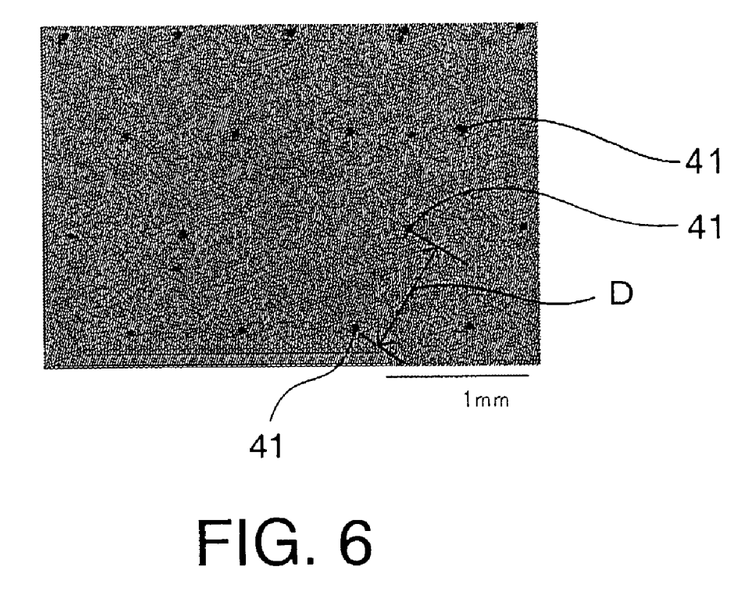
FIG. 6 is, an optical microscope photograph of a cross section of the glass preform of Example 1, taken along a line VI—VI in FIG. 1.
Figure 7:
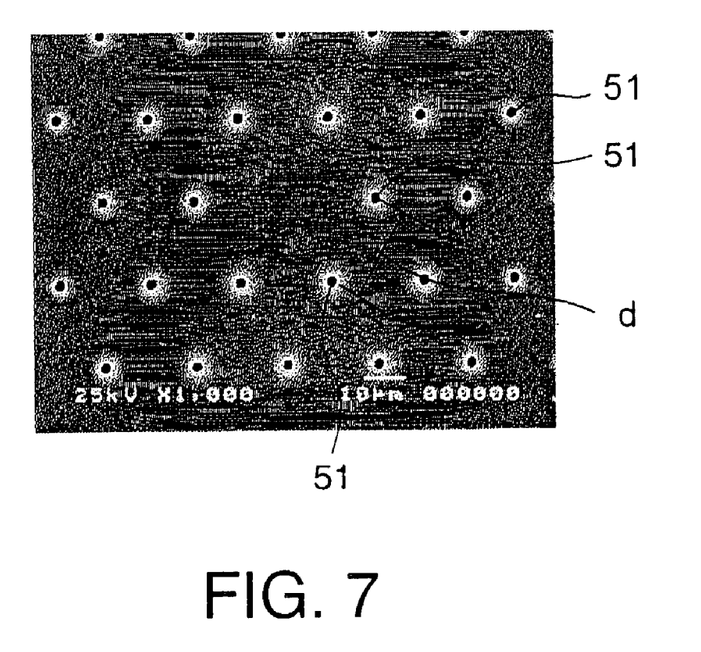
FIG. 7 is an SEM image photograph of a cross section of the optical waveguide material of Example 1, taken along a line VII—VII in FIG. 5.

Referring to FIGS. 6 and 7, the glass preform in each of Examples 1 to 3 had a close-packed structure in which the glass capillaries were closely packed. In the glass preform and the optical waveguide material, air hole intervals D and d were uniform and air holes 41 and 51 were uniform in size and kept in a shape of a true circle. No disturbance in the periodic structure was observed. In the cross section of the glass preform in FIG. 6, no air gap was present between the glass capillaries (Examples 1 and 2) and little air gaps were left between the glass capillaries (Example 3). Referring to FIG. 7, the optical waveguide material produced by the use of each of these glass preforms, no interstitial site was present (although Examples 2 and 3 are not shown).

Thus, in each of the glass preforms in Examples 1 to 3, each of the glass capillaries and the glass rod need not be processed into a polygonal cylindrical shape. Therefore, the glass preform is obtained at a low cost. By the fiber-drawing of the glass preform, it is possible to produce the optical waveguide material having an undisturbed periodic structure in its cross section without any interstitial site. Thus, the glass preform is suitable as a raw material of the optical waveguide material, such as a photonic crystal fiber (PCF), a holey fiber, and a photonic bandgap fiber (PBF), having high accuracy.

On the other hand, in Comparative Example 1, the close-packed structure was not obtained because of presence of a large amount of air gaps between the glass capillaries, as shown in Table 1. The air hole interval was considerably irregular or nonuniform. The variation in size of the air holes was large. Furthermore, the air holes were deformed into an elliptical shape or some of the air holes were collapsed (not shown). In Comparative Example 2, the close-packed structure was partly obtained. However, the air gaps were locally present between the glass capillaries. The air hole interval was nonuniform and the variation in size of the air holes was observed. The shape of the air hole was elliptical (not shown).

What is claimed is:

1. A glass preform to be subjected to fiber-drawing, the glass preform comprising:
   a cylindrical glass tube whose one end in an axial direction is sealed; and
   a plurality of glass capillaries extending in the glass tube in the axial direction and fused to one another into an integral structure, the glass capillaries having air holes periodically arranged on a plane perpendicular to the axial direction, respectively, and each of the glass capillaries is made of a glass containing, by mass %, 55–95% $SiO_2$, 1–30% $B_2O_3$, and 0.1–10% $Na_2O$.

2. The glass preform according to claim 1, wherein the glass capillaries are kept in tight contact with one another without any gap.

3. The glass preform according to claim 1, wherein each of the glass capillaries has longitudinal opposite ends both of which are sealed.

4. An optical waveguide material produced by fiber-drawing of the glass preform according to claim 1 and having a number of air holes periodically arranged on the plane.

5. The glass preform according to claim 1, wherein the glass tube is kept reduced in pressure.

6. The glass preform according to claim 1, which has one end in the axial direction, the one end of the glass preform being sealed.

7. The glass preform according to claim 1, wherein each of the glass capillaries is made of a glass consisting essentially of, by mass %, 55–95% $SiO_2$, 1–30% $B_2O_3$, and 0.1–10% $Na_2O$, 0–10% $Al_2O_3$, 0–5% CaO, 0–10% BaO, and 0–5% $K_2O$.

8. The glass preform according to claim 1, further comprising at least one glass rod disposed in the glass tube and extending in the axial direction.

9. The glass preform according to claim 8, wherein the glass rod is made of a multi-component glass.

10. The glass preform according to claim 8, wherein the glass rod is made of a borosilicate glass.

11. The glass preform according to claim 8, wherein each of the glass capillaries and the glass rod is made of a glass without absorption of light having a wavelength of 1400 nm by OH groups.

12. The glass preform according to claim 8, wherein each of the glass capillaries and the glass rod has a refractive index (nd) between 1.45 and 2.00.

13. A glass preform to be subjected to fiber-drawing, the glass preform comprising:
  a cylindrical glass tube whose one end in an axial direction is sealed;
  a plurality of glass capillaries extending in the glass tube in the axial direction and fused to one another into an integral structure, the glass capillaries having air holes periodically arranged on a plane perpendicular to the axial direction, respectively; and
  at least one glass rod disposed in the glass tube and extending in the axial direction, wherein each of the glass capillaries and the glass rod is made of a glass containing, by mass %, 55–95% $SiO_2$, 1–30% $B_2O_3$, and 0.1–10% $Na_2O$.

14. An optical waveguide material produced by fiber-drawing of the glass preform according to claim 13 and having a number of air holes periodically arranged on the plane.

15. A glass preform to be subjected to fiber-drawing, the glass preform comprising:
  a cylindrical glass tube whose one end in an axial direction is sealed; and
  a plurality of glass capillaries extending in the glass tube in the axial direction and fused to one another into an integral structure, the glass capillaries having air holes. periodically arranged on a plane perpendicular to the axial direction, respectively;
  at least one glass rod disposed in the glass tube and extending in the axial direction, wherein each of the glass capillaries and the glass rod is made of a glass consisting essentially of, by mass %, 55–95% $SiO_2$, 1–30% $B_2O_3$, and 0.1–10% $Na_2O$, 0–10% $Al_2O_3$, 0–5% CaO, 0–10% BaO, and 0–5% $K_2O$.

16. An optical waveguide material produced by fiber-drawing of the glass preform according to claim 15 and having a number of air holes periodically arranged on the plane.

* * * * *